(12) United States Patent
Chin et al.

(10) Patent No.: US 9,590,458 B2
(45) Date of Patent: Mar. 7, 2017

(54) ELECTRICAL MACHINE WITH CIRCUMFERENTIALLY SKEWED ROTOR POLES OR STATOR COILS

(71) Applicant: ABB Research Ltd., Zurich (CH)

(72) Inventors: Robert Chin, Vasteras (SE); Juhani Mantere, Tuusula (FI)

(73) Assignee: ABB Research Ltd., Zurich (CH)

( * ) Notice: Subject to any disclaimer, the term of this patent is extended or adjusted under 35 U.S.C. 154(b) by 10 days.

(21) Appl. No.: 13/650,695

(22) Filed: Oct. 12, 2012

(65) Prior Publication Data

US 2013/0088116 A1 Apr. 11, 2013

Related U.S. Application Data

(63) Continuation of application No. PCT/EP2010/054808, filed on Apr. 13, 2010.

(51) Int. Cl.
| | |
|---|---|
| *H02K 1/16* | (2006.01) |
| *H02K 1/14* | (2006.01) |
| *H02K 1/27* | (2006.01) |
| *H02K 29/03* | (2006.01) |
| *H02K 1/22* | (2006.01) |

(52) U.S. Cl.
CPC ............ *H02K 1/165* (2013.01); *H02K 1/148* (2013.01); *H02K 1/22* (2013.01); *H02K 1/278* (2013.01); *H02K 29/03* (2013.01)

(58) Field of Classification Search
CPC ........... H02K 1/146; H02K 1/165; H02K 1/06
USPC .................... 310/216.111, 216.112, 216.019, 310/216.069–216.073, 216.074, 179, 180, 310/184, 208
See application file for complete search history.

(56) References Cited

U.S. PATENT DOCUMENTS

| | | | |
|---|---|---|---|
| 4,315,171 A | 2/1982 | Schaeffer | |
| 4,751,416 A | 6/1988 | Torok | |
| 5,173,651 A * | 12/1992 | Buckley et al. | ............... 318/701 |
| 6,265,804 B1 * | 7/2001 | Nitta et al. | ............. 310/216.066 |
| 6,285,104 B1 | 9/2001 | Nashiki | |
| 6,288,471 B1 * | 9/2001 | Kometani et al. | ..... 310/216.001 |
| 6,747,386 B2 * | 6/2004 | Fujinaka | ................ 310/216.074 |

(Continued)

FOREIGN PATENT DOCUMENTS

| | | |
|---|---|---|
| DE | 10019801 A1 | 1/2002 |
| EP | 0178755 A2 | 4/1986 |

(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

(Continued)

*Primary Examiner* — Thomas Truong
(74) *Attorney, Agent, or Firm* — Whitmyer IP Group LLC

(57) ABSTRACT

A rotor for an electrical machine including a plurality of pole sections with adjacent poles within each of the pole sections being distanced by a first uniform pole pitch. Adjacent poles belonging to different pole sections are distanced by a second (smaller) pole pitch at one end of each pole section, and by a third (larger) pole pitch at the other end of each pole section. Alternatively, a corresponding adjustment of coil pitches can be done in a stator of an electrical machine.

10 Claims, 4 Drawing Sheets

(56) References Cited

U.S. PATENT DOCUMENTS

| | | | |
|---|---|---|---|
| 6,750,582 B1 * | 6/2004 | Neet | H02K 3/24 310/201 |
| 6,762,520 B1 * | 7/2004 | Ehrhart et al. | 310/86 |
| 7,038,349 B2 * | 5/2006 | Suzuki et al. | 310/216.008 |
| 8,232,704 B2 * | 7/2012 | Qin et al. | 310/216.012 |
| 2004/0183393 A1 | 9/2004 | Suzuki et al. | |
| 2007/0284959 A1 * | 12/2007 | Huppunen et al. | 310/156.53 |
| 2008/0296989 A1 * | 12/2008 | Fujita et al. | 310/156.44 |
| 2009/0085415 A1 * | 4/2009 | Ionel | H02K 1/148 310/43 |
| 2010/0176675 A1 * | 7/2010 | Labbe et al. | 310/154.01 |

FOREIGN PATENT DOCUMENTS

| | | | | |
|---|---|---|---|---|
| JP | 2123953 A | | 5/1990 | |
| JP | 3284148 A | | 12/1991 | |
| JP | 8251847 A | | 9/1996 | |
| JP | 09154246 A | * | 6/1997 | H02K 1/26 |
| JP | 2004289919 A | | 10/2004 | |
| JP | 2005137117 A | | 5/2005 | |

OTHER PUBLICATIONS

Machine Translation, Takahashi et al., JP 09154246 A, Jun. 10, 1997.*

Bianchi, et al.; "Design Techniques for Reducing the Cogging Torque in Surface-Mounted PM Motors"; IEEE Transactions on Industry Applications vol. 38, No. 5; Sep./Oct. 2002; pp. 1259-1265.

International Preliminary Report on Patentability; Application No. PCT/EP2010/054808; Completed: Jun. 26, 2012; 15 pages.

International Search Report & Written Opinion of the International Searching Authority; Application No. PCT/EP2010/054808; Completed: Jan. 24, 2011; Mailed: Jan. 31, 2012; 17 pages.

Written Opinion of the International Preliminary Examining Authority; Application No. PCT/EP2010/054808; Mailed Apr. 2, 2012; 6 pages.

European Office Action Application No. EP 10 713 641 Dated: Oct. 21, 2013 4 pages.

* cited by examiner

ELECTRICAL MACHINE WITH CIRCUMFERENTIALLY SKEWED ROTOR POLES OR STATOR COILS

FIELD OF THE INVENTION

The present invention relates to electrical machines with a non-uniform rotor pole pattern and/or a non-uniform stator tooth pattern.

BACKGROUND OF THE INVENTION

According to FIG. 1, a rotor 101 of a conventional electrical machine 100 comprises α. plurality of magnetic rotor poles 102 uniformly divided along a rotor perimeter. The angular distances between two adjacent rotor poles (centre lines) are called pole pitches 103, and they all have an equal value of α. Similarly, a stator 110 of a conventional electrical machine 100 comprises a plurality of uniformly distributed stator teeth 111 separated by stator slots 112. Conductors 113 are extending in the stator slots, the angular distances between two adjacent conductors (centre lines) being called coil pitches 114. In a conventional electrical machine according to FIG. 1 the conductors are thereby distanced by uniform coil pitches 114 with a value β.

A rotor with permanent magnetic poles exhibits torque ripple caused by a cyclic torque called cogging. Cogging results from the tendency of the rotor and the stator to align themselves in a position of minimum magnetic reluctance, and this phenomenon exists even in an un-energized machine. Cogging occurs when the rotor poles are moving over the edges of the stator teeth. The magnitude of cogging is the sum of interaction between individual rotor poles and stator teeth, and it depends on the relationship between the number of rotor poles and stator teeth.

The cogging problem is conventionally addressed by adjusting rotor poles. In permanent magnet machines for example, when rotor poles comprise several magnets arranged in rows extending in an axial direction, it is known to skew the individual magnets in relation to one another in circumferential direction. It is also known to shape the permanent magnets in order to make the moving over a stator tooth edge smoother. Furthermore, it is known to adjust the angular distances of adjacent rotor poles such that the distances become non-uniform. Corresponding adjusting measures can also be applied to the stator teeth, but many times the adjustment of rotor poles is practically more feasible than the adjustment of stator teeth.

U.S. Pat. No. 4,751,416 discloses a permanent magnet motor with non-uniformly distributed magnetic poles on the rotor. The magnetic poles are displaced through an angle corresponding to a fraction of a stator slot pitch i.e. the angular distance between adjacent stator tooth edges. In some embodiments of U.S. Pat. No. 4,751,416 the magnetic forces acting on the rotor are not in balance, while in the other embodiments magnetic forces are balanced out. In the balanced embodiments the magnetic poles are effectively adjusted pair-wise.

U.S. Pat. No. 6,285,104 discloses a permanent magnet motor and a synchronous reluctance motor with non-uniformly distributed magnetic poles on the rotor. U.S. Pat. No. 6,285,104 further discloses a stator with non-uniformly distributed stator teeth. According to all embodiments of U.S. Pat. No. 6,285,104 the magnetic poles or the stator teeth are displaced such that the magnetic forces acting on the rotor are not in balance.

Unbalanced magnetic forces are clearly not desirable since the unbalance causes vibrations that may become unacceptably strong. It is also not desirable to adjust the rotor poles pair-wise because of the complexity of this adjustment from the manufacturing point of view. There is therefore a desire to provide a magnetically balanced alternative to the pair-wise adjustment of the magnetic poles.

JP8251847 discloses a permanent magnet machine with non-uniformly distributed magnetic poles on the rotor. The poles are adjusted in a balanced manner by symmetrically adjusting the circumferential positions of groups of poles. The rotor consists of a single non-divided segment.

JP2005137117 discloses a permanent magnet machine wherein the rotor is divided into a plurality of discrete segments.

JP3284148 discloses an electrical machine wherein a cogging torque reduction is achieved by shifting groups of stator pole shoes in clockwise or anticlockwise direction while maintaining the coils at uniform circumferential distances.

SUMMARY OF THE INVENTION

One object of the invention is to provide an electrical motor wherein a cogging problem is addressed in a manufacturing-friendly manner.

This object is achieved by the devices according to the present teachings.

According to a first aspect of the invention there is provided a rotor for an electrical machine. The rotor comprises $n_{ps}$ pole sections, $n_{ps}$ being an even number of at least four. Each pole section comprises $n_p$ poles, $n_p$ being an integer greater than one. Adjacent poles within each of the pole sections are distanced by a first pole pitch with a value $\alpha_1$. Adjacent poles belonging to different pole sections are distanced by a second pole pitch with a value $\alpha_2$ at one end of each pole section, and by a third pole pitch with a value $\alpha_3$ at the other end of each pole section. All the values $\alpha_1$, $\alpha_2$ and $\alpha_3$ are different. By providing pole sections with a uniform pole pitch, and with deviating pole pitches between pole sections, the cogging problem can be addressed without the need to adjust the magnetic poles individually or pair-wise.

According to one embodiment of the invention the value $\alpha_2$ is smaller than the value $\alpha_1$, and the value $\alpha_3$ is greater than the value $\alpha_1$. This embodiment is achieved in a simple way of skewing the magnetic poles circumferentially in groups, and it provides a preferred cogging characteristic.

According to one embodiment of the invention the poles are aligned in a substantially symmetrical manner about the centre axis of the rotor. Symmetrical alignment of the poles enables balanced magnetic forces and thereby a vibration free operation of the machine.

According to one embodiment of the invention the rotor is divided into a plurality of discrete segments along interfaces between different pole sections. By this measure the rotor parts become smaller and lighter and thereby easier to handle.

According to one embodiment of the invention all the rotor segments have a substantially identical construction. This condition assumes that the rotor is divided into segments along symmetry axes of the rotor cross section, and that the rotor is symmetrical in axial direction. By providing rotor segments with identical construction the number of dissimilar rotor parts becomes fewer.

According to a second aspect of the invention there is provided a stator for an electrical machine. The stator comprises $n_{cs}$ coil sections, $n_{cs}$ being an even number of at least four. Each coil section comprises $n_c$ conductors, $n_c$ being an integer greater than one. Adjacent conductors within each of the coil sections are distanced by a first coil pitch with a value $\beta_1$. Adjacent conductors belonging to different coil sections are distanced by a second coil pitch with a value $\beta_2$ at one end of each coil section, and by a third coil pitch with a value $\beta_3$ at the other end of each coil section. All the values $\beta_1$, $\beta_2$ and $\beta_3$ are different. By providing coil sections with a uniform coil pitch, and with deviating coil pitches between coil sections, the cogging problem can be addressed in a simple manner.

According to one embodiment of the invention the value $\beta_2$ is smaller than the value $\beta_1$, and the value $\beta_3$ is greater than the value $\beta_1$. This embodiment is achieved in a simple way of skewing the stator coils circumferentially in groups, and it provides a preferred cogging characteristic.

According to one embodiment of the invention the conductors are aligned in a substantially symmetrical manner about the centre axis of the stator. Symmetrical alignment of the conductors enables balanced magnetic forces and thereby a vibration free operation of the machine.

According to one embodiment of the invention the stator is divided into a plurality of discrete segments along interfaces between different coil sections. By this measure the stator parts become smaller and lighter and thereby easier to handle.

According to one embodiment of the invention all the stator segments have a substantially identical construction. This condition assumes that the stator is divided into segments along symmetry axes of the stator cross section, and that the stator is symmetrical in axial direction. By providing stator segments with identical construction the number of dissimilar stator parts becomes fewer.

According to one embodiment of the invention the adjacent conductors distanced by a first coil pitch are separated by a first stator tooth, and the adjacent conductors distanced by a second coil pitch are separated by a second stator tooth, the second stator tooth being narrower than the first stator tooth, or the second stator tooth being omitted. Adjusting the widths of the stator teeth is a simple way of skewing the stator coils circumferentially. By omitting a stator tooth a manufacturing of impractically narrow stator tooth is avoided.

According to one embodiment of the invention the adjacent conductors distanced by a first coil pitch are separated by a first stator tooth, and the adjacent conductors distanced by a third coil pitch are separated by a third stator tooth, the third stator tooth being wider than the first stator tooth. Adjusting the widths of the stator teeth is a simple way of skewing the stator coils circumferentially.

According to a third aspect of the invention there is provided a method for addressing a cogging problem of an existing electrical machine comprising a rotor. The method comprising the steps of: dividing the rotor between rotor poles into a plurality of radial segments; removing a sector of rotor iron from a segment end; adding a sector of rotor iron to an opposite segment end; bringing the modified segments together to form a rotor. By this measure a rotor of an existing electrical machine can be modified in a simple way to address the cogging problem.

According to a fourth aspect of the invention there is provided a method for addressing a cogging problem of an existing electrical machine comprising a stator. The method comprising the steps of: dividing the stator across stator teeth into a plurality of radial segments; removing a sector of stator iron from a segment end; adding a sector of stator iron to an opposite segment end; bringing the modified segments together to form a stator. By this measure a stator of an existing electrical machine can be modified in a simple way to address the cogging problem.

BRIEF DESCRIPTION OF THE DRAWINGS

The invention will be explained in greater detail with reference to the accompanying drawings, wherein.

DETAILED DESCRIPTION OF THE INVENTION

Figure 1:
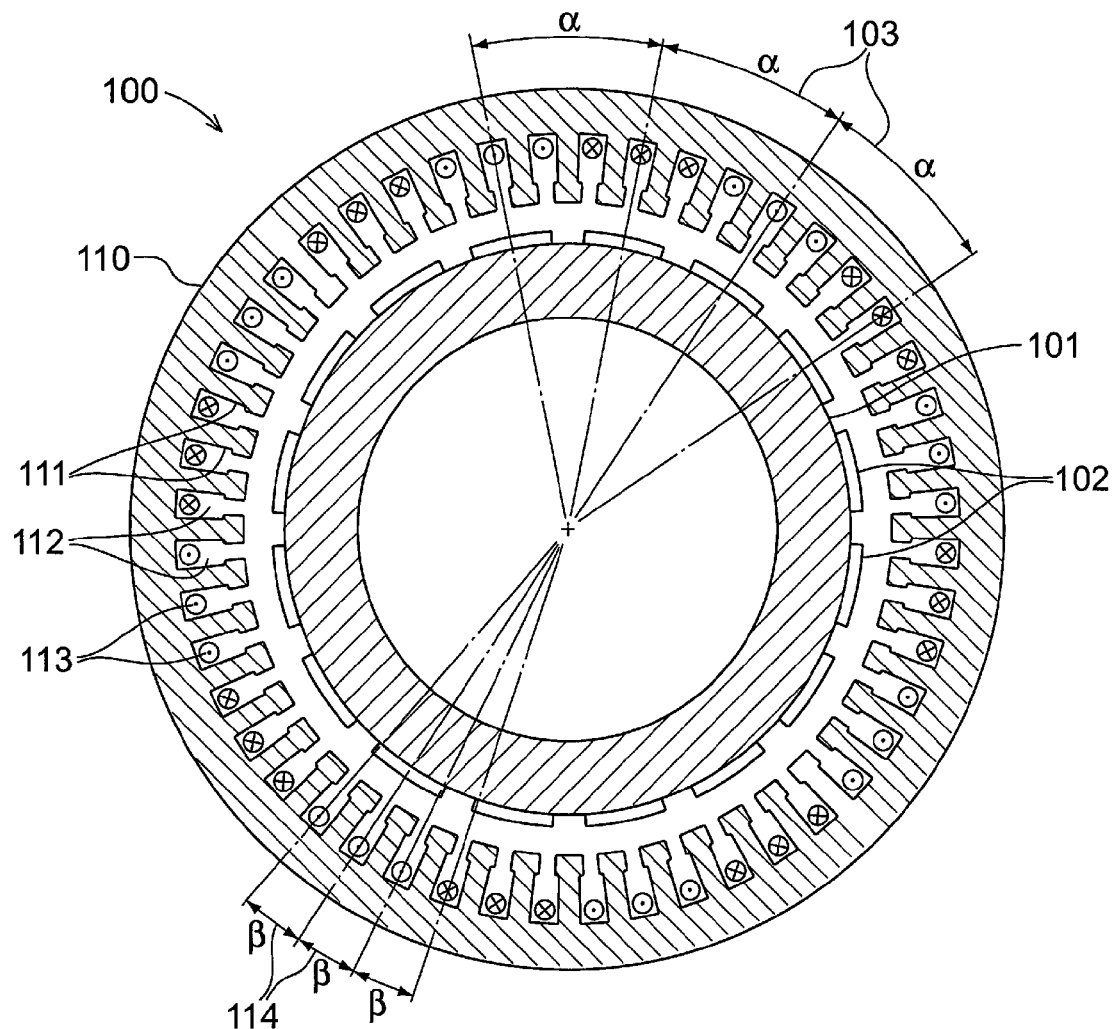
FIG. 1 shows a prior art electrical machine with a uniform pole pitch in a rotor and a uniform coil pitch in a stator.
Figure 2:
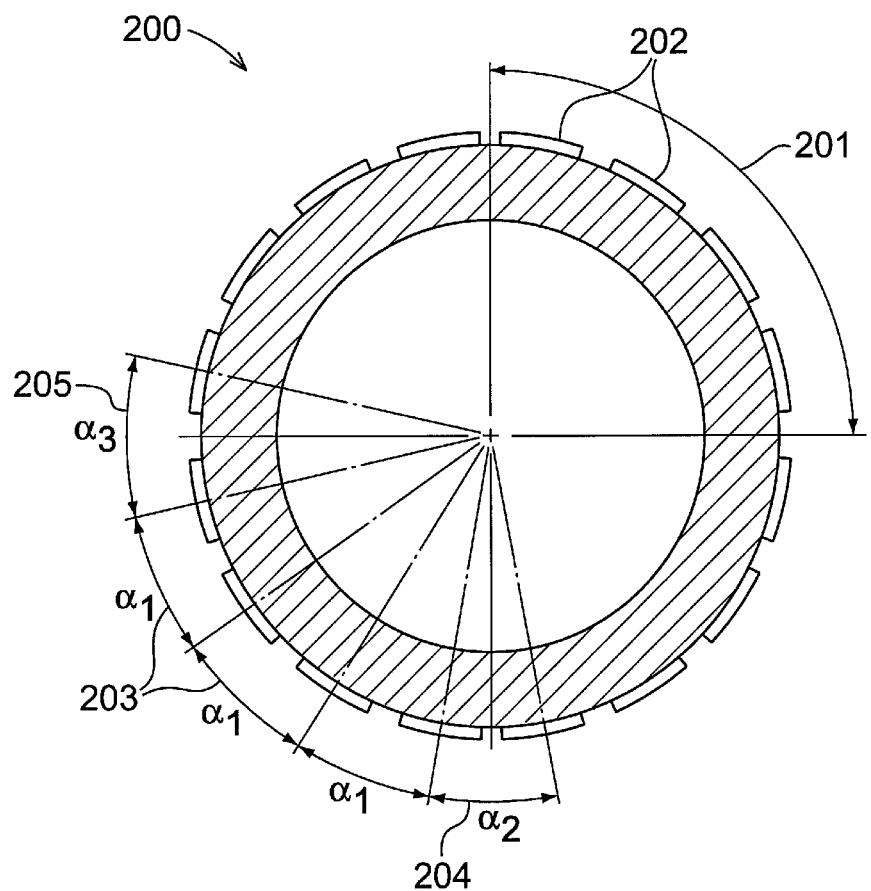
FIG. 2 shows a rotor according to the invention.

Referring to FIG. 2, a rotor 200 for an electrical machine is shown which comprises four pole sections 201. Each pole section 201 comprises four magnetic poles 202, the adjacent poles 202 within each pole section 201 being distanced from one another by a first pole pitch 203 with a value $\alpha_1=22.5°$. The adjacent poles 202 belonging to different pole sections 201 are distanced by a second pole pitch 204 with a value $\alpha_2=20°$ at one end of each pole section 201, and by a third pole pitch 205 with a value $\alpha_3=25°$ at the other end of each pole section 201. It can therefore be considered that, compared with the uniformly distributed poles 102 of FIG. 1, all the poles 202 within every second pole section 201 are displaced clockwise through an angle of 1.25°, while all the poles 202 within the remaining pole sections 201 are displaced counter-clockwise through the same angle.

The rotor 200 according to FIG. 2 can be divided into four discrete segments along the interfaces between different pole sections 201. As a result, four rotor segments comprising equally distanced poles 202 are achieved. Indeed, when the division is made along the symmetry axes of the rotor cross-section, the resulting adjacent rotor segments become mirror-images. This means that provided that the rotor segments are symmetrical in axial direction, all the rotor segments become an identical construction. From a manufacturing point of view it is greatly advantageous to put the rotor 200 together out of identical segments with uniform pole pitches 203 instead of adjusting each pole pair individually. Dividing the rotor 200 into segments has an additional advantage in that the individual machine parts become smaller and thereby easier to handle and transport.

Starting from the conventional rotor 101 of FIG. 1 a rotor 200 according to the present invention is achieved by taking the following steps: dividing the conventional rotor 101 between rotor poles 102 into four identical segments; removing a 1.25° sector of rotor iron from each of the segment ends at two opposite division interfaces; adding a 1.25° sector of rotor iron to each of the segment ends at the two remaining division interfaces; bringing the modified segments together to form a rotor 200 according to the present invention. The size of the removed and added rotor iron sectors can, of course, vary depending on the configuration of the subject rotor.

Figure 3:
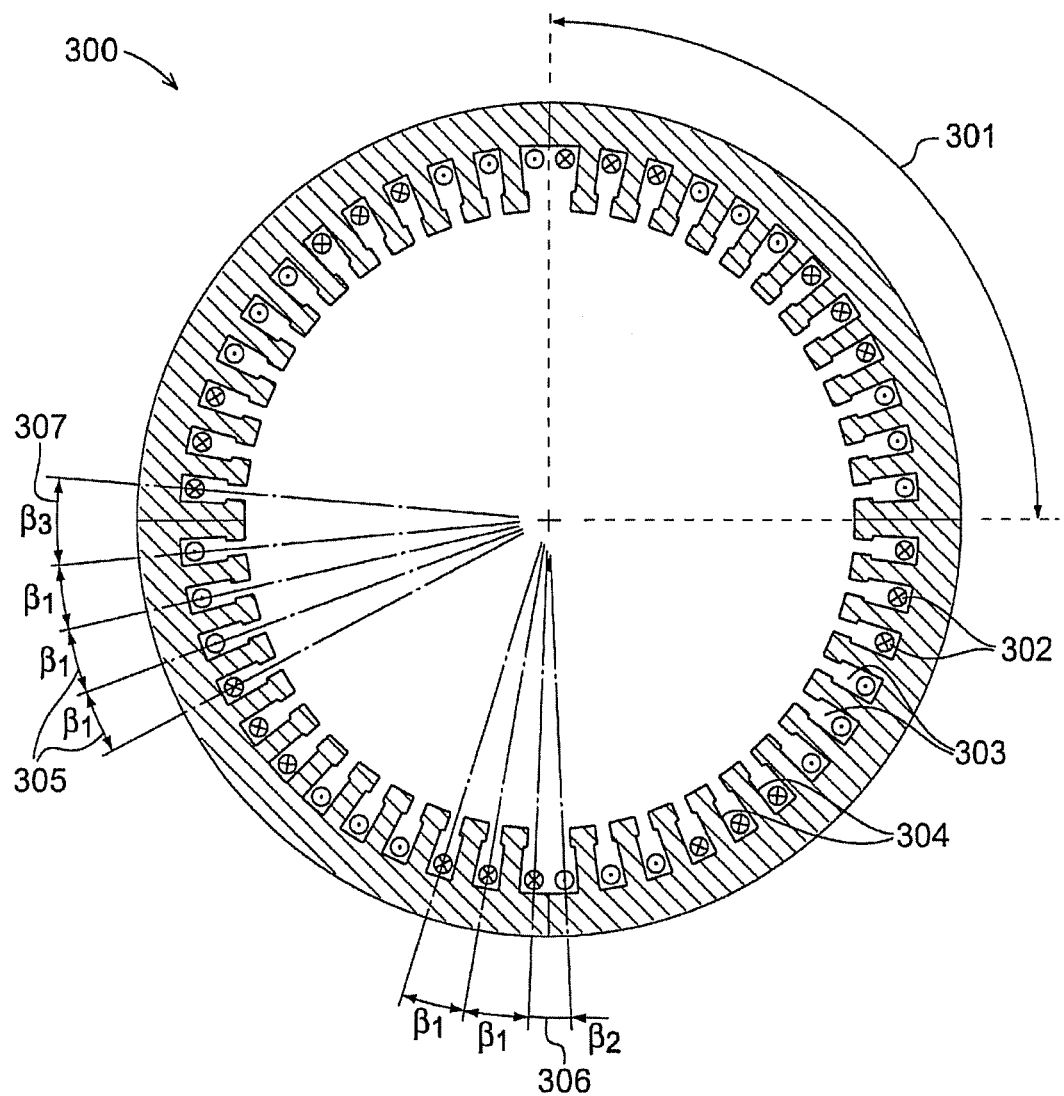
FIG. 3 shows a stator according to the invention.

Referring to FIG. 3, a stator 300 for an electrical machine is shown which comprises four coil sections 301. Each coil section 301 comprises twelve conductors 302 extending in stator slots 303 defined between stator teeth 304. These twelve conductors 302 represent coils in three electrical phases, two coils per phase, each coil comprising a first conductor 302 extending from a first axial end of the stator 300 to a second axial end of the same, and each coil further comprising a second conductor 302 extending from the second axial end of the stator 300 to the first axial end of the same. In practice each coil consists of a single loop extending in two different stator slots 303, but for purposes of describing the present invention the parts of single loops located in different stator slots 303 are considered as separate conductors 302.

Figure 4:
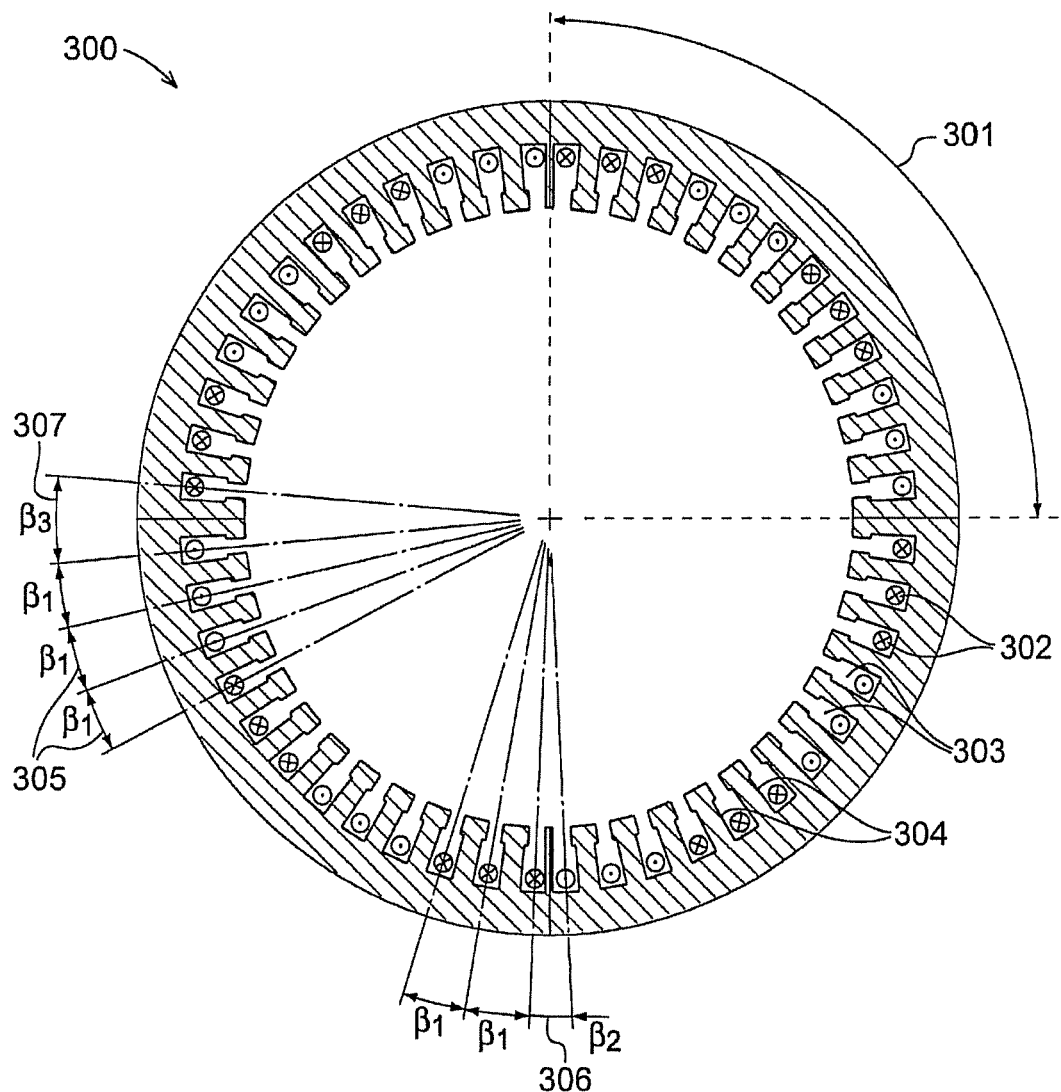
FIG. 4 shows a stator according to the invention.

In the present example adjacent conductors 302 within each coil section 301 are distanced from one another by a first coil pitch 305 with a value $\beta_1 = 7,5°$. Adjacent conductors 302 belonging to different coil sections 301 are distanced by a second coil pitch 306 with a value $\beta_2 = 5°$ at one end of each coil section 301, and by a third coil pitch 307 with a value $\beta_3 = 10°$ at the other end of each coil section 301. It can therefore be considered that, compared with the uniformly distributed conductors 113 of FIG. 1, all the conductors 302 within every second coil section 301 are displaced clockwise through an angle of 1.25°, while all the conductors 302 within the remaining coil sections 301 are displaced counter-clockwise through the same angle. In practice this displacement results to a narrower stator tooth 304 at every second interface between coil sections 301, and a correspondingly wider stator tooth 304 at the remaining interfaces between coil sections 301 (FIG. 4). In FIG. 3 the narrower tooth 304 has been completely omitted.

The number of conductors 302 within each coil section 301 should be chosen such that all the conductors 302 belonging to a same coil are within the same coil section 301. In this way no coil is crossing an interface between two coil sections 301, and the stator 300 can easily be divided into discrete segments along the coil section interfaces. In the present example the stator 300 could also comprise 8 coil sections 301 each having 6 conductors 302 i.e. one coil per phase. Division of the stator 300 into several discrete segments makes the size of the individual machine parts smaller and easier to handle and transport. As with the rotor 200, dividing the stator 300 along symmetry axes of the stator cross-section, the construction of the resulting stator segments becomes identical provided that the stator 300 is symmetrical in axial direction. In a preferred embodiment the stator 300 is divided into a plurality of segments along interfaces between different coil sections 301.

Starting from the conventional stator 110 of FIG. 1 a stator 300 according to the present invention is achieved by taking the following steps: dividing the stator 110 across stator teeth 111 into four identical segments; removing a 1.25° sector of stator iron from each of the segment ends at two opposite division interfaces; adding a 1.25° sector of stator iron to each of the segment ends at the two remaining division interfaces; bringing the modified segments together to form a stator 300 according to the present invention. As a result of removing stator iron the remaining stator teeth 304 may become very narrow. In certain cases, such as that shown in FIG. 3, these narrow teeth 304 can be omitted. The size of the removed and added stator iron sectors can, of course, vary depending on the configuration of the subject stator.

It is to be noted that the same effect of reduced cogging can be achieved both by displacing rotor poles 202 and by displacing stator coils according to the above description. A rotor 200 according to the present invention can be used together with a conventional stator 110 with a uniform conductor distribution, and a stator 300 according to the present invention can be used together with a conventional rotor 101 with a uniform pole distribution. Furthermore, a rotor 200 according to the present invention can be used together with a stator 300 according to the present invention. In such a combination both the rotor 200 and the stator 300 has a non-uniform distribution of poles 202 and conductors 302, respectively. The pole section number can furthermore be different from the coil section number.

The invention is not limited to the embodiments shown above, but the person skilled in the art may, of course, modify them in a plurality of ways within the scope of the invention as defined by the claims. Thus, the invention is not limited to permanent magnet machines, but may also be applied to electrically excited machines or reluctance machines. Furthermore, the number of pole sections 201 and coil sections 301 as well as the number of corresponding segments is not limited to those mentioned in the examples above, but many times it is in deed advantageous to have greater number of sections.

What is claimed is:

1. A stator for an electrical machine, the stator comprising
    $n_{cs}$ coil sections of equal size that divide the stator evenly, $n_{cs}$ being an even number of at least four, each coil section comprising $n_c$ conductors, $n_c$ being an integer greater than one and the number of conductors in each coil section being the same, adjacent conductors within each of the coil sections being distanced by a first coil pitch with a value $\beta_1$, the value $\beta_1$ being equal for all adjacent conductors within the same coil section,
    adjacent conductors belonging to different coil sections being distanced by a second coil pitch with a value $\beta_2$ at one end of each coil section, and by a third coil pitch with a value $\beta_3$ at an opposite end of each coil section, the values $\beta_1$, $\beta_2$ and $\beta_3$ being different from each other,
    wherein the value $\beta_2$ is smaller than the value $\beta_1$, and the value $\beta_3$ is greater than the value $\beta_1$;
    wherein the stator is physically divided into a plurality of discrete segments along interfaces between the adjacent conductors belonging to different coil sections such that no conductor crosses the interfaces between the discrete segments.

2. The stator according to claim 1, wherein the conductors are aligned in a substantially symmetrical manner about a centre axis of the stator.

3. The stator according to claim 1, wherein all the stator segments have a substantially identical construction.

4. The stator according to claim 1, wherein the adjacent conductors distanced by the first coil pitch are separated by a first stator tooth, and the adjacent conductors distanced by the second coil pitch are separated by a second stator tooth, the second stator tooth being narrower than the first stator tooth.

5. The stator according to claim 1, wherein the adjacent conductors distanced by the first coil pitch are separated by a first stator tooth, and the adjacent conductors distanced by the third coil pitch are separated by a third stator tooth, the third stator tooth being wider than the first stator tooth.

6. The stator according to claim 1, wherein the adjacent conductors distanced by the first coil pitch are separated by a first stator tooth, and the adjacent conductors distanced by the second coil pitch are separated without a stator tooth therebetween.

7. The stator according to claim 1, wherein said conductors represent coils in a plurality of electrical phases, and;
    wherein for each coil section, each coil includes at least one first conductor extending from a first axial end of the stator to a second axial end of the stator and at least one second conductor extending from the second axial end to the first axial end.

8. An electrical machine comprising a stator,
the stator having $n_{cs}$ coil sections of equal size that divide the stator evenly, $n_{cs}$ being an even number of at least four, each coil section comprising $n_c$ conductors, $n_c$ being an integer greater than one and the number of conductors in each coil section being the same, adjacent conductors within each of the coil sections being distanced by a first coil pitch with a value $\beta_1$, the value $\beta_1$ being equal for all adjacent conductors within the same coil section,
adjacent conductors belonging to different coil sections being distanced by a, second coil pitch with a value $\beta_2$ at one end of each coil section, and by a third coil pitch with a value $\beta_3$ at an opposite end of each coil section, the values $\beta_1$, $\beta_2$ and $\beta_3$ being different from each other, wherein the value $\beta_2$ is smaller than the value $\beta_1$, and the value $\beta_3$ is greater than the value $\beta_1$;
wherein the stator is physically divided into a plurality of discrete segments along interfaces between the adjacent conductors belonging in to different coil sections such that no conductor crosses the interfaces between the discrete segments.

9. The electrical machine according to claim 8, wherein the adjacent conductors distanced by the first coil pitch are separated by a first stator tooth, and the adjacent conductors distanced by the second coil pitch are separated without a stator tooth therebetween.

10. The electrical machine according to claim 8, wherein said conductors represent coils in a plurality of electrical phases, and;
wherein for each coil section, each coil includes at least one first conductor extending from a first axial end of the stator to a second axial end of the stator and at least one second conductor extending from the second axial end to the first axial end.

* * * * *